Sept. 11, 1956 J. HALLER 2,762,078
MOLDING PRESS WITH ADJUSTABLE CORE ROD
Filed June 28, 1951 3 Sheets-Sheet 2

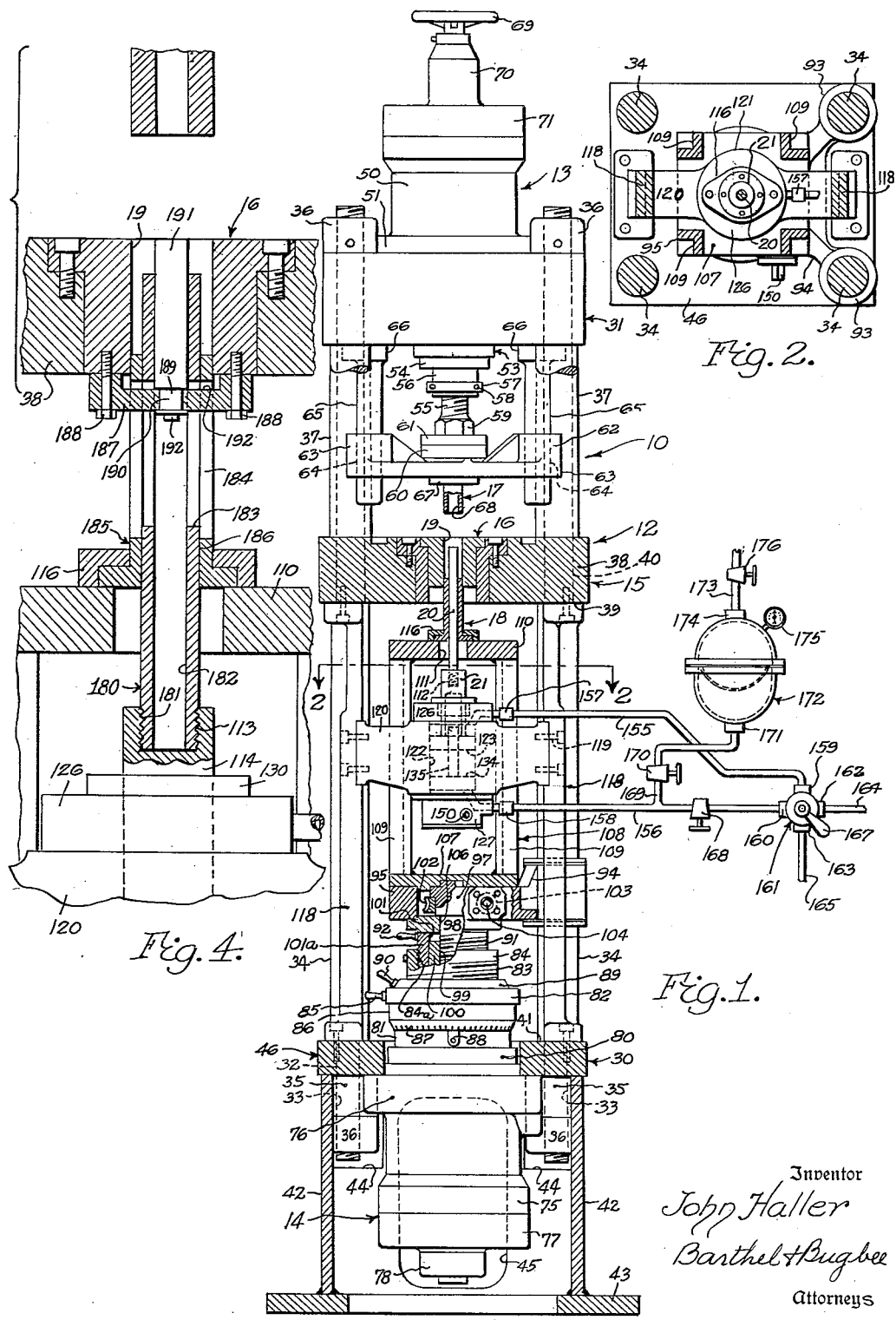

Inventor
John Haller
Barthel & Bugbee
Attorneys

Inventor
John Haller
Barthel & Bugbee
Attorneys

United States Patent Office 2,762,078
Patented Sept. 11, 1956

2,762,078
MOLDING PRESS WITH ADJUSTABLE CORE ROD

John Haller, Northville, Mich.

Application June 28, 1951, Serial No. 234,111

1 Claim. (Cl. 18—16.5)

This invention relates to presses and, in particular, to powdered metal molding presses.

One object of this invention is to provide a powdered metal molding press for making elongated powdered metal workpieces, wherein the tendency for the powdered metal to bind against the walls of the die cavity is relieved by mounting the core rod upon a yieldingly urged fluid pressure plunger, thereby enabling the core rod to be backed off away from the molding plunger and yielding relatively to the die cavity walls upon the building up of a predetermined resistance during the molding operation.

Another object is to provide a powdered metal molding press of the foregoing character, wherein a source of pressure fluid at a predetermined pressure is connected to the core rod supporting plunger, thereby permitting the core rod to yield in a direction away from the molding plunger upon the attainment of a predetermined molding pressure so as to permit the attainment of an adequate density in the intermediate portions of the workpiece without having to apply excessive molding pressures to the end portions thereof.

Another object is to provide a powdered metal molding press of the foregoing character wherein the core rod may also be advanced or retracted at the will of the operator instead of yielding automatically at the attainment of a predetermined molding pressure.

Further objects and advantages will become apparent during the course of the following description of the accompanying drawings, wherein:

Figure 1 is a side elevation, partly in central vertical section of a powdered metal molding press according to one form of the invention, showing the yielding mounting of the core rod;

Figure 2 is a horizontal section taken along the line 2—2 in Figure 1;

Figure 4 is an enlarged fragmentary side elevation, partly in central vertical section, of a modified portion of the powdered metal molding press of Figure 1, as adapted to the molding of cup-shaped workpieces;

Figures 5 to 8 inclusive are fragmentary diagrammatic central vertical sections through the die cavity of the molding press of Figure 1, showing the successive positions of the parts in molding a powdered metal sleeve;

Figures 9 to 12 inclusive are fragmentary diagrammatic central vertical sections through the die cavity of the molding press of Figure 1, showing the successive positions of the parts in an alternative method of molding a powdered metal sleeve; and Figures 13 to 17 inclusive are fragmentary diagrammatic central vertical sections through the die cavity of the modified molding press of Figure 4, showing the successive positions of the parts in molding a powdered metal cup.

Figure 3:
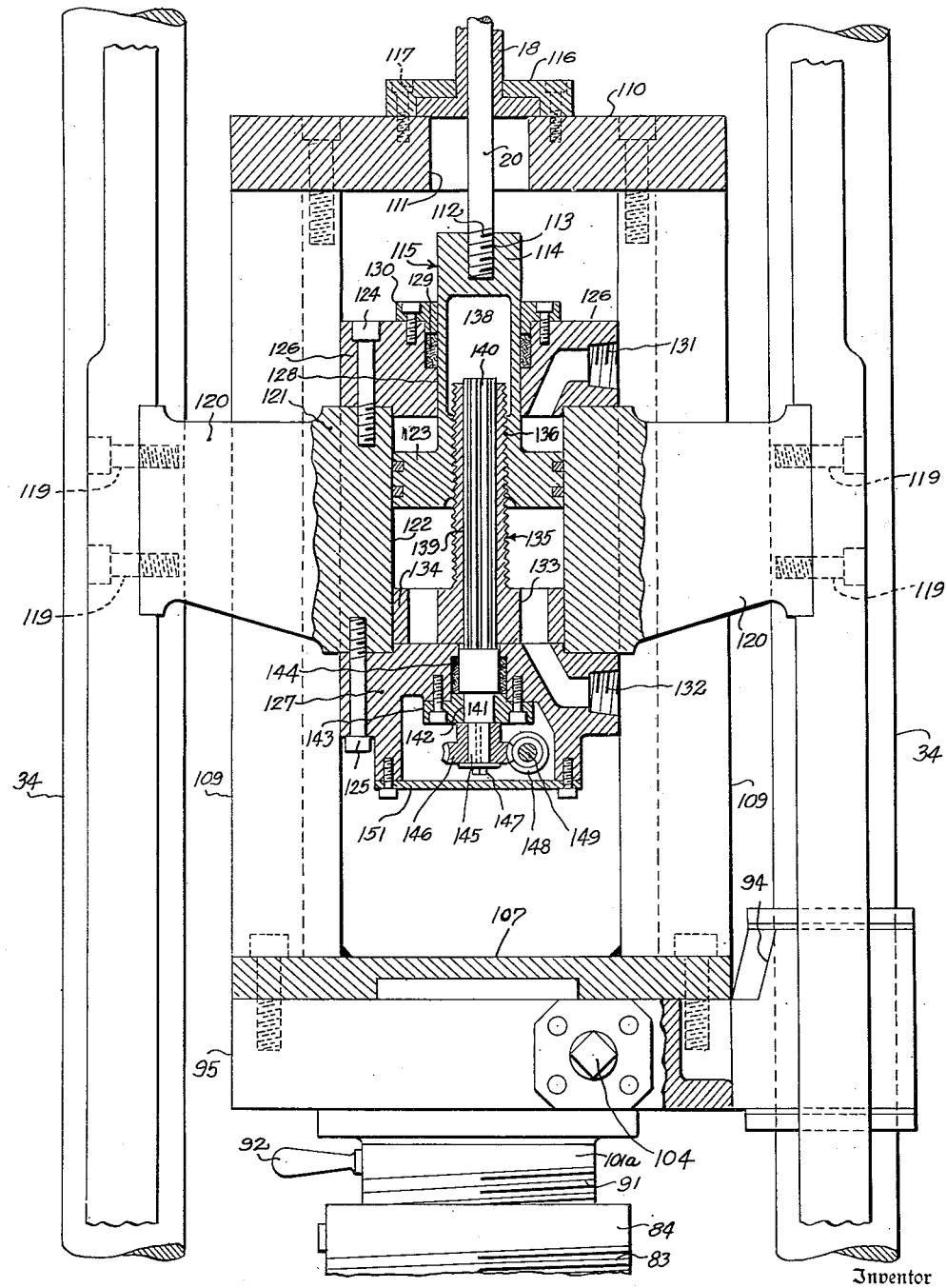
Figure 3 is an enlarged fragmentary side elevation, partly in central vertical section, of the core rod moving cylinder and plunger and their associated parts.
Figure 5:
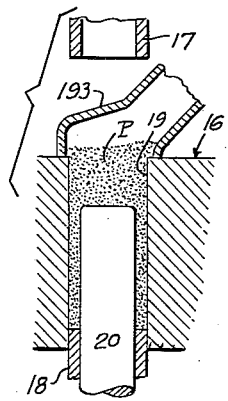

Referring to the drawings in detail, Figures 1 to 3 inclusive show a hydraulic press, generally designated 10, according to one form of the invention as consisting generally of a frame structure 12 carrying an upper plunger unit 13, a lower plunger unit 14, and an intermediately-located press table unit 15. Associated with the units are a tubular mold or die 16 having upper and lower punches 17 and 18 respectively adapted to enter the opposite ends of the mold or die bore or cavity 19. The punches 17 and 18 are tubular and a core rod 20 projects upward through the lower punch 18 and is held by a core rod support 21. These elements will subsequently be described in more detail below.

The frame structure 12 consists of a press base 30 and head 31 of approximately rectangular outline and drilled as at 32 and 33 respectively near their four corners to receive the lower and upper ends respectively of strain rods 34, the base 30 having downwardly extending bosses 35 for receiving the strain rods 34. The ends of the strain rods 34 are threaded to receive internally-threaded nuts 36 by which the frame structure 12 is held together. Tubular spacing members 37 are arranged between the press head 31 and the table unit 15, and the strain rods 34 are reduced in diameter immediately below the table 38 of the table unit 15 so as to provide annular shoulders 39 upon which the table 38 rests (Figure 1). The table 38 is bored as at 40 for the passage of the reduced diameter upper portions of the strain rods 34. The lower ends of the strain rods 34 are similarly reduced in diameter at the points where they enter the bores 32 above the base 30 so as to provide annular shoulders 41 at that location. In this manner, a rigid frame is provided for supporting the various units of the press.

In order to support the lower plunger unit 14 above the floor level, the bed 30 is supported on vertical side plates 42 (Figure 1) which at their lower ends are welded or otherwise secured to an open-centered rectangular floor plate 43. The side plates 42 are provided with cutaway portions 44 at their upper corners to provide clearance for the nuts 36 (Figures 1 and 4). Access openings 45 are also provided in two of the side plates 42. The press base 30 and side plates 42, together with the floor plate 43, form a press base structure, generally designated 46.

The upper plunger unit 13 includes an upper cylinder 50 having an outwardly extending flange 51 adapted to rest upon an opening (not shown) in the press head 31. The internal construction of the upper plunger unit 13 is shown and described in my co-pending application Serial No. 179,017, filed August 12, 1950, for Hydraulic Molding Press, and its details are beyond the scope of the present invention. The upper plunger unit 13 is provided with a reciprocable plunger 53 descending therefrom and having a cap 54 bolted or otherwise secured to its lower end. The cap 54 is provided with an internally threaded bore (not shown) threadedly receiving a screw shaft 55. The latter is prevented from rotating during the operation of the press 10 by means of a split clamping nut 56 which also threadedly receives the screw shaft 55 and which is integral with and extends downward from the cap 54. A split collar 57 having clamping bolts 58 serves to compress the split nut 56 and clamp the screw shaft 55 in its adjusted position.

The screw shaft 55 immediately below its threaded portion is provided with a polygonal portion 59 for the reception of a suitable wrench for the purpose of rotating the screw shaft 55 and consequently making any desired adjustment thereof upward or downward. Below the polygonal portion 59, the screw shaft 55 passes through a cylindrical block 60 and a closure ring 61 which is bolted or otherwise secured to the cross head 62 by screws (not shown) which in turn pass through both the ring 61 and the block 60. The cross head 62 (Figure 1) has enlargements or bosses 63 which are bored as at 64 to slidably engage vertical guide rods 65, the upper ends of which are seated in sockets (not shown) in the press head 31 and held therein by flanged portions 66 bolted to the lower surface of the press head 31.

The upper tubular punch 17 is flanged and held in position against the lower surface of the cross head 62 by a retaining ring 67 bolted thereto. The punch 17 is provided with a central bore 68 of a diameter suitable to receive the upper end of the core rod 20 in a snug sliding fit. The outer diameter of the punch 17 fits the die cavity or mold core 19 also with a snug sliding fit.

The upper plunger unit 13 at its upper end is provided with a hand wheel 69 mounted in a boss 70 extending upwardly from the cylinder head 71 (Figure 1). The hand wheel 69 is rotated in one direction or the other to raise or lower a threaded stop (not shown) within the cylinder 50 so as to limit the upward motion of the upper plunger 53, as described in my above-mentioned co-pending application.

The lower plunger unit 14 has a general similarity in construction to the upper plunger unit 13 except that it lacks the adjusting hand wheel 69. The internal construction of the lower plunger unit 14 is also described in my above-mentioned co-pending application and its details are beyond the scope of the present invention. For the purposes of the present invention, it may be said to possess a lower cylinder 75 having an outwardly-extending flange portion 76 which is bolted or otherwise suitably secured to the press base 30. The cylinder 75 is closed at its lower end by a cylinder head 77 bolted or otherwise secured thereto and carries a compound fluid supply head 78 at its lower end to which are connected the two pressure fluid service pipes (not shown) for the cylinder 75.

Bolted or otherwise fixedly secured to the upper end of the flange portion 76 is the flanged lower end 80 of an upstanding stop sleeve 81. The upper end of the stop sleeve 81 is engaged by an internally-threaded stop ring 82 which is threaded upon the threaded upper end portion 83 of the hollow outer piston 84 which reciprocates in the cylinder 75 and which is freely reciprocable within the stop sleeve 81. The stop ring 82 is provided with a handle 85 and a downwardly extending tubular skirt or sleeve 86 which has a beveled circumferentially-graduated edge 87 registering with a graduated vertical scale 88 to show the amount by which the stop ring 82 is rotated and consequently the amount by which the hollow outer piston 84 is lowered in the cylinder 75 at the lower end of its stroke. The stop ring 82 is locked in its adjusted position by an internally threaded locking ring 89 likewise threaded upon the threaded portion 83 and provided with a handle 90. The hollow outer piston 84 is threaded internally to receive an externally threaded sleeve 91 with a handle 92.

Slidably mounted on two of the strain rods 34 are the links 93 of a V-shaped twin-arm bracket 94 (Figure 2) having a square outer end 95. The end 95 has a bore 96 receiving the head 97 of a screw shaft 98. The screw shaft 98 is threaded into the internally threaded upper end bore 99 of an inner piston 100 which is reciprocable in the bore 101 of a stop sleeve 101a which in turn is threaded into a threaded bore 84a in the hollow outer piston 84. The screw shaft head 97 carries a worm gear 102 rotated by a worm 103 on a worm shaft 104 having a squared end for receiving a hand crank (not shown), as described in my above-mentioned co-pending application. The bore 101 is closed by a closure plate 105 bolted to the bracket end 95 and bored as at 106 for the passage of the screw shaft 98.

Bolted to the upper side of the bracket end 95 is the base 107 of a cage-like lower punch supporting structure, generally designated 108 and having four uprights or posts 109 of angle cross-section rising from the base 107 and at their upper ends carrying a platform 110 having a central aperture 111 for the passage of the core rod 20 (Figure 1). The lower end of the core rod 20 is threaded as at 112 and is received within a threaded socket 113 in the rod 114 of a piston 115 (Figure 3). The lower punch 18, which is tubular, is flanged at its lower end and secured to the platform 110 by a cup-shaped ring 116 bolted thereto as at 117.

Extending between the press base structure 46 and the table 38 and bolted thereto are two parallel uprights 118 (Figures 1 and 2) to which is bolted as at 119 a bridge member 120 (Figure 3). The uprights 118 are placed midway between the strain rods 34 so that the bridge member 120 extends diametrically across the axis of the various cylinders and pistons of the press. The bridge member 120 at its midportion is provided with a cylindrical enlargement 121 having therein a vertical bore 122 which is co-axial with the axis of the various press plungers and within which the piston head 123 of the piston 115 is reciprocably mounted. Bolted as at 124 and 125 to the upper and lower ends of the bore 122 are cylinder heads 126 and 127 respectively. The cylinder head 126 is provided with a central bore 128 through which the rod 114 of the piston 115 passes, leakage being prevented by a packing 129 and gland 130 surrounding the rod 114 and bolted to the upper cylinder head 126. The latter is also provided with a port 131 opening into the upper end of the cylinder bore 122 and threaded to receive the correspondingly threaded end of a pressure fluid supply pipe. The lower cylinder head 127 is similarly provided with a port 132 having an internally threaded outer end, the port 132 at its inner end registering with one of a circularly arranged series of ports 133 in the head 134 of a stop screw 135, the shank of which is threaded through a correspondingly threaded bore 136 in the piston rod 114 into a hollow 138 therein (Figure 3). The stop screw 135 in turn is provided with a bore 139 of spline cross-section to receive a spline shaft 140, the lower plain end 141 of which is stepped and rotatably mounted in a bore 142 in a closure plate or gland 143 bolted to the cylinder head 127 and compressing a packing 144 to prevent leakage. Mounted on the extreme lower end 145 of the stepped portion 141 is a worm gear 146 held in position by the screw or bolt 147 and meshing with a worm 148 on a worm shaft 149. The worm shaft 149 is journalled in the cylinder head 127 and has a squared outer end 150 for receiving a hand crank (not shown). A closure plate 151 bolted to the lower end of the cylinder head 127 closes the cavity 152 in which the worm gear 146 and worm 148 are housed.

For the purpose of supplying pressure fluid to the upper and lower service ports 131 and 132 of the cylinder heads 126 and 127, service pipes 155 and 156 (Figure 1) are threaded into connections 157 and 158 which in turn are threaded into the threaded ports 131 and 132. The service pipes 155 and 156 lead to the service connections 159 and 160 of a conventional four-way valve 161 having a pressure-fluid supply connection 162 and a fluid discharge or exhaust connection 163 to which are connected pressure fluid supply pipes 164 and 165 leading to a conventional hydraulic pump (not shown). Alternatively, of course, the discharge or exhaust pipe 165 may lead to a fluid reservoir, such as an oil tank, from which the pump withdraws oil and forces it under pressure through the supply pipe 164. The four-way valve 161 is provided with a valve member 166 operated by a handle 167. Any suitable conventional type of four-way valve may be used, different types being known to those skilled in the hydraulic press and machinery art and with rotary or reciprocating valve members operated manually or electrically by solenoids, or hydraulically by pistons and cylinders. The details of the four-way valve 161 form no part of the present invention and the construction thereof falls outside the scope of the present invention.

A shut-off or stop valve 168 is provided in the service pipe 156 between the four-way valve 161 and the point of attachment of an auxiliary pipe 169 also having a similar stop valve 170 therein and leading to the bottom connection 171 of an accumulator 172, a pipe 173 leading from the top connection 174 thereof for supplying compressed air or other suitable gas to the upper portion of the accumulator 172, the pressure thereof being registered on a pressure gauge 175. A stop valve 176 is also interposed in the gas line 173 for shutting off the supply of compressed air or other gas and preventing the escape thereof from the upper portion of the accumulator 172.

The modified die and plunger shown in Figure 4 slightly alters the construction in the upper central portion of Figure 1 in order to produce the cup-shaped workpiece shown in Figures 13 to 17 inc., the modification having a fixed core rod rather than the movable core rod 20 shown in Figures 1 to 3 inclusive. For this purpose, the solid core rod 20 is removed from its threaded socket 113 in the upper end of the piston rod 114 and replaced by an inner lower tubular plunger 180 having a threaded portion 181 engaging the threaded socket 113 and having a bore 182 in the center thereof with an elongated slot 183 in the upper side wall thereof. Aligned with the slot 183 is a corresponding elongated slot 184 formed in the lower outer tubular plunger 185 which replaces the lower tubular plunger or punch 18. The lower outer tubular plunger 185 is held in place by the cup-shaped ring 116, as shown at the upper end of Figure 3. The outer tubular plunger 185 has a bore 186 therein slidably receiving the inner tubular plunger 180 and the outer tubular plunger 185 itself slidably fits the die bore 19 of the die 16.

Extending through the aligned slots 183 and 184 is a bridge member 187 which at its opposite ends is bolted as at 188 to the lower end of the die 16. The central portion of the bridge member 187 is provided with a bore 189 into which the reduced diameter end portion 190 of a fixed core rod 191 is inserted and secured in place by the retaining screw and washer unit 192. The core rod 191 is thus relatively short in length and fixed in position by its being mounted upon the bridge member 187. The latter is cut away on its upper portion as at 192 to permit a greater range of motion of the outer and inner lower tubular plungers 185 and 180 respectively.

To produce the thin-walled elongated sleeve S shown in Figures 5 to 8 inclusive, the core rod 20 is lowered so that its upper end is below the top of the die cavity 19. The depth to which the top of the core rod 20 descends can be accurately regulated and adjusted by rotating the stop screw 135 by means of the squared shaft 149, the worm 148 and worm wheel 146 (Figure 3). When the piston 123 moves downward, the stop screw 135 moves downward with it until the bottom of the head 134 engages the inner or upper surface of the cylinder head 127. The outer plunger or punch 18 is lowered so that its upper end is substantially at the bottom of the die cavity 19, depending of course upon the length of the article S to be molded. The powdered metal P is supplied to the die bore 19 by means of a conventional filling shoe 193 which is omitted from Figure 1 in order to avoid crowding the drawing. The filling shoe 193 is well-known in powdered metal molding presses and its details form no part of the present invention. The filling shoe 193 reciprocates to and fro across the mouth of the die bore 19 and along the top surface of the die 16. It is connected to a conventional filling hopper, also not shown and likewise not included in the invention.

Figure 6:
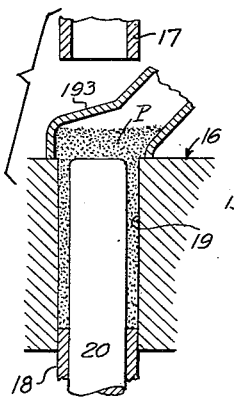

The filling shoe 193 moves across the mouth of the die bore 19 (Figure 5) and deposits its charge of powdered metal P into the die cavity or bore 19, filling the cavity around the upper portion of the core rod 20. The powder P may be of any of the metals or metal alloys used in powder metallurgy such as powdered iron, bronze, or other alloys. While the filling shoe 193 is maintained in position over the mouth of the die bore or cavity 19, pressure fluid is supplied to the lower service port 132 through the lower service line 156 by way of the four-way valve 161, the valve being set to discharge or exhaust line 165. The pressure fluid acting in the lower end of the cylinder bore 122 (Figure 3) against the bottom of the piston head 123 moves the latter upward and with it the core rod 20 so that the top of the core rod 20 becomes flush with the top of the die 16 (Figure 6). At the same time, the upper side of the piston head 123 contacts the lower surface of the cylinder head 126, halting the piston 123 at the desired point. This arrangement enables the die cavity or bore 19 to be filled more satisfactorily than has hitherto been possible.

Figure 7:
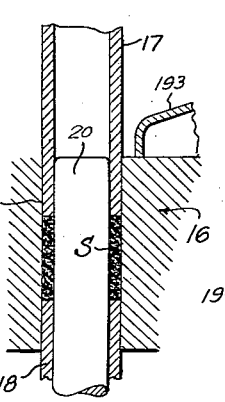
Figure 8:
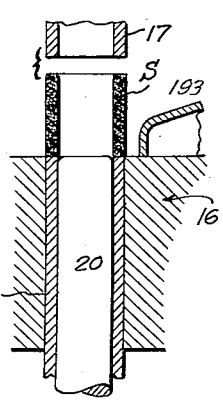

The filling shoe 193 is now retracted (Figure 7) and pressure applied to the upper plunger unit or hydraulic motor 13, causing the plunger 53 to move downward and thereby causing the upper tubular punch or molding plunger 17 to enter the upper end of the die bore or cavity 19 around the core rod 20 (Figure 7). At the same time, the pressure fluid is admitted to the lower hydraulic plunger unit 14, causing the lower punch-supporting structure 108 to rise, moving the lower outer tubular plunger or punch 18 upward. In this manner, the charge of powdered metal P is compressed between the two oppositely-moving tubular punches or plungers 17 and 18 to the desired density.

The upper punch or tubular plunger 17 is now retracted by admitting pressure fluid to the lower end of the upper plunger unit 13 (Figure 8) and at the same time, the lower plunger or punch 18 is moved upward until its upper end is flush with the top surface of the die 16, expelling the sleeve S. This is accomplished by admitting pressure fluid beneath the head of an additional plunger within the lower plunger unit 14, as described in my above-mentioned co-pending application Ser. No. 179,017, filed August 12, 1950. The sleeve S is now transferred to a sintering oven and sintered at the requisite temperature, depending upon the nature of the powdered metal of which it is composed, as is well known in the powdered metallurgy art. The lower outer punch 18 and core rod 20 are then retracted to the position shown in Figure 5, and the foregoing process steps are repeated.

Figure 9:
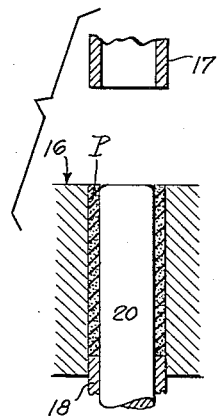
Figure 10:
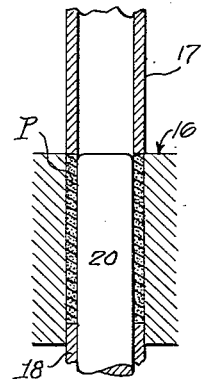
Figure 11:
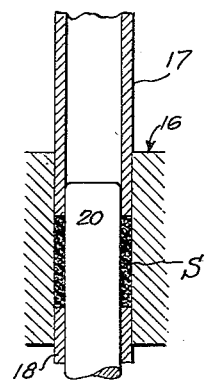
Figure 12:
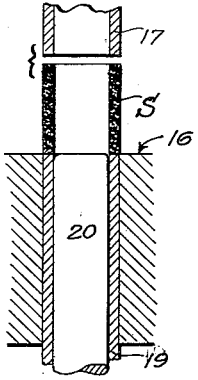
Figure 13:
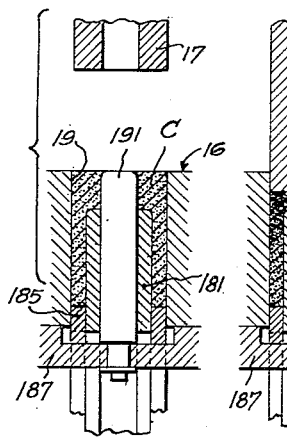
Figure 14:
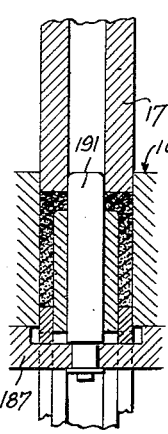
Figure 15:
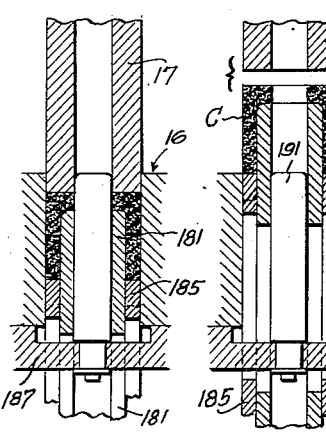

To enable a more uniform density to be obtained in the sleeve S, the sequence of operations is slightly modified as shown in Figures 9 to 12 inclusive. Here the core rod 20 is raised until it is flush with the top of the die 16 (Figure 9), leaving the lower outer tubular punch or molding plunger 18 with its top near the lower end of the die bore 19 (Figure 9). With the upper tubular punch 17 retracted into its raised position, the filling shoe 193 is again moved across the mouth of the die bore 19 to fill with powdered metal the annular cavity lying between the core rod 20 and the die bore 19. The filling shoe 193 is then retracted as shown in Figure 7 and the upper tubular punch 17 is now moved downward (Figure 10), closing the die cavity 19.

Assuming that the upper portion of the accumulator 172 has been charged with compressed air or other gas at the desired pressure, as indicated by the pressure gauge 175, the valves 176 and 168 are now closed and the valve 170 opened (Figure 1). The upper and lower tubular punches or molding plungers 17 and 18 are now caused to move toward one another (Figure 11), compressing the powdered metal charge P between them. As the upper plunger 17 moves downward, the friction of the powdered metal particles against the wall of the die bore 19 against the core rod 20 causes the core rod 20 to yield and move downward as the pressure exerted upon the fluid in the accumulator 172 by the compressed air therein is overcome. The overwhelming force exerted on the core rod 20 pushes the piston 123 and stop screw 125 downward, forcing the fluid out through the lower port 132 and pipes 156 and 169 into the accumulator 172. When the sleeve S has been sufficiently compressed in this manner, so that the desired density is obtained, the upper tubular punch or plunger 17 is retracted and the lower tubular punch 19 and core rod 20 advanced, ejecting the sleeve S. The sleeve S is now transferred to a sintering oven and sintered in the ordinary manner at the requisite temperature, as is well-known to those skilled in powder metallurgy.

Figure 16:
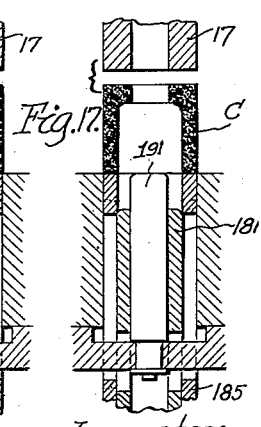

To produce the cup-shaped workpiece C, the procedure shown in Figures 13 to 17 inclusive is employed, using the modified apparatus shown in Figure 4. At the outset, with the upper tubular punch or plunger 17 retracted and the lower inner and outer tubular plungers or punches 181 and 185 disposed in the relative positions shown in Figure 13, the filling shoe 193 (Figure 5) is moved across the mouth of the die cavity 19 in the die 16, filling with powdered metal the cavity around the inner tubular punch or plunger 181 and core rod 191. The filling shoe 193 is now retracted, and the upper tubular punch or molding plunger advanced downward to close the mouth of the mold cavity 19 (Figure 14) and partially compress the charge P. The lower outer tubular plunger or punch 185 is now raised (Figure 15) by supplying pressure fluid to the lower service port 132 through the pipes 164 and 156 (Figure 1) assuming the valve 168 to be open and the valve 170 to be closed. This pressure fluid forces the piston head 123 upward, carrying with it the inner tubular punch or plunger 181 (Figure 16). At the same time, the lower outer tubular punch 185 is moved upward in the manner previously described and the upper tubular punch 17 retracted, ejecting the cup C, and stripping the bottom of the cup C off the core rod 191. Pressure fluid is now admitted through the upper service port 131 (Figure 3) to force the piston 123 downward, carrying with it the lower inner tubular punch or plunger 181, retracting the latter into the die cavity 19 and stripping it from the cup C (Figure 17). The cup C is then transferred to a sintering oven and sintered from the proper time and at the proper temperature under conventional procedures well-known to those skilled in the powder metallurgy art.

What I claim is:

An adjustably movable core rod apparatus for attachment to a powdered metal molding press having a die table, said apparatus comprising a support adapted to be attached to the press beneath the table thereof, a hydraulic cylinder mounted on said support and having a cylinder bore therein and fluid passageways communicating with said bore near the opposite ends thereof, a piston reciprocably mounted in said bore, a core rod connected to said piston and projecting upward from said cylinder, said piston having a threaded portion, and a stop member having a threaded portion mounted upon the threaded portion of said piston, said stop member being engageable with a part of said cylinder during the reciprocation of said piston and limiting the stroke of said piston.

References Cited in the file of this patent
UNITED STATES PATENTS

| | | |
|---|---|---|
| 714,269 | Walton | Nov. 25, 1902 |
| 2,338,491 | Cutler | Jan. 14, 1944 |
| 2,397,106 | Haller | Mar. 26, 1946 |
| 2,428,493 | Haller | Oct. 7, 1947 |
| 2,499,980 | Stokes et al. | Mar. 7, 1950 |
| 2,556,951 | Weidner | June 12, 1951 |
| 2,562,876 | Baeza | Aug. 7, 1951 |